US008040507B2

(12) United States Patent
Shibayama

(10) Patent No.: US 8,040,507 B2
(45) Date of Patent: Oct. 18, 2011

(54) SPECTROMETER

(75) Inventor: Katsumi Shibayama, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 189 days.

(21) Appl. No.: 12/465,245

(22) Filed: May 13, 2009

(65) Prior Publication Data

US 2009/0284742 A1    Nov. 19, 2009

(30) Foreign Application Priority Data

May 15, 2008 (JP) ............................. P2008-128687
Dec. 5, 2008 (JP) ............................. P2008-311076

(51) Int. Cl.
*G01J 3/28* (2006.01)
(52) U.S. Cl. ..................................................... 356/328
(58) Field of Classification Search ........... 356/326–328
See application file for complete search history.

(56) References Cited

U.S. PATENT DOCUMENTS

| 4,644,632 | A | 2/1987 | Mächler et al. |
| 5,995,221 | A | 11/1999 | Slutter et al. |
| 6,081,331 | A | 6/2000 | Teichmann |
| 6,303,934 | B1 * | 10/2001 | Daly et al. ............... 250/339.02 |
| 6,538,736 | B1 | 3/2003 | Palumbo |
| 6,859,274 | B2 | 2/2005 | Inamoto |
| 7,697,137 | B2 | 4/2010 | Comstock, II |
| 7,864,317 | B2 * | 1/2011 | Bockstaele et al. ............ 356/328 |
| 2002/0060792 | A1 * | 5/2002 | Ibsen et al. .................... 356/328 |
| 2003/0197862 | A1 * | 10/2003 | Cohen et al. .................. 356/328 |
| 2006/0268269 | A1 * | 11/2006 | Warren ......................... 356/328 |
| 2008/0123095 | A1 * | 5/2008 | Hubner et al. ................ 356/328 |

(Continued)

FOREIGN PATENT DOCUMENTS

DE    197 17 015    10/1998

(Continued)

OTHER PUBLICATIONS

H.W. Teichmann, et al., "Replizierter Mikro-Optischer Sensor Fur Die Industrielle Spektralsensorik", tm-Technisches Messen, vol. 68, No. 5, May 2001, pp. 200-203 (with partial English-language translation).

(Continued)

*Primary Examiner* — Kara E Geisel
(74) *Attorney, Agent, or Firm* — Drinker Biddle & Reath LLP

(57) ABSTRACT

In the spectrometer 1, a lens portion 3 having a spherical surface 35 on which a spectroscopic portion 4 is provided and a bottom plane 31 in which a light detecting element 5 is disposed, has a side plane 32 substantially perpendicular to the bottom plane 31 and a side plane 34 substantially perpendicular to the bottom plane 31 and the side plane 32. Then, a package 11 that houses a spectroscopy module 10 has side planes 16 and 18 respectively coming into planar-contact with the side planes 32 and 34, and contact portions 22 coming into contact with the spherical surface 35. Therefore, the side planes 32 and 34 of the lens portion 3 are respectively brought into planar-contact with the side planes 16 and 18 of the package 11 while bringing the spherical surface 35 of the lens portion 3 into contact with the contact portions 22 of the package 11, that positions the spectroscopic portion 4 and the light detecting element 5 with respect to a light incident window plate 25 of the package 11.

5 Claims, 13 Drawing Sheets

U.S. PATENT DOCUMENTS

| | | | |
|---|---|---|---|
| 2009/0284741 A1 | 11/2009 | Shibayama et al. |
| 2009/0284743 A1 | 11/2009 | Shibayama |
| 2009/0290154 A1 | 11/2009 | Shibayama et al. |
| 2009/0290155 A1 | 11/2009 | Shibayama et al. |
| 2009/0290164 A1 | 11/2009 | Shibayama et al. |
| 2011/0075143 A1 | 3/2011 | Shibayama et al. |

FOREIGN PATENT DOCUMENTS

| | | | |
|---|---|---|---|
| FR | 2847978 | * | 6/2004 |
| JP | 04-287001 | | 10/1992 |
| JP | 04-294223 | | 10/1992 |
| JP | 06-167637 | | 6/1994 |
| JP | 8-145794 | | 6/1996 |
| JP | 2592081 | | 3/1999 |
| JP | 2000-065642 | | 3/2000 |
| JP | 2000-298066 | | 10/2000 |
| JP | 2003-139611 | | 5/2003 |
| JP | 2003-243444 | | 8/2003 |
| JP | 2004-191246 | | 7/2004 |
| JP | 2004-309146 | | 11/2004 |
| JP | 2004-354176 | | 12/2004 |
| JP | 2007-199540 | | 8/2007 |
| WO | WO 2008/029852 | | 3/2008 |
| WO | WO 2008/149939 | | 12/2008 |
| WO | WO 2008/149940 | | 12/2008 |
| WO | WO 2008/149944 | | 12/2008 |

OTHER PUBLICATIONS

U.S. Appl. No. 12/992,398, filed Feb. 10, 2011, Shibayama
U.S. Appl. No. 12/992,428, filed Feb. 23, 2011, Shibayama
U.S. Appl. No. 12/992,445, filed Feb. 2, 2011, Shibayama
U.S. Appl. No. 12/992,412, filed Feb. 28, 2011, Shibayama
U.S. Appl. No. 12/992,469, filed Feb. 8, 2011, Shibayama

* cited by examiner

Fig.7
(a)
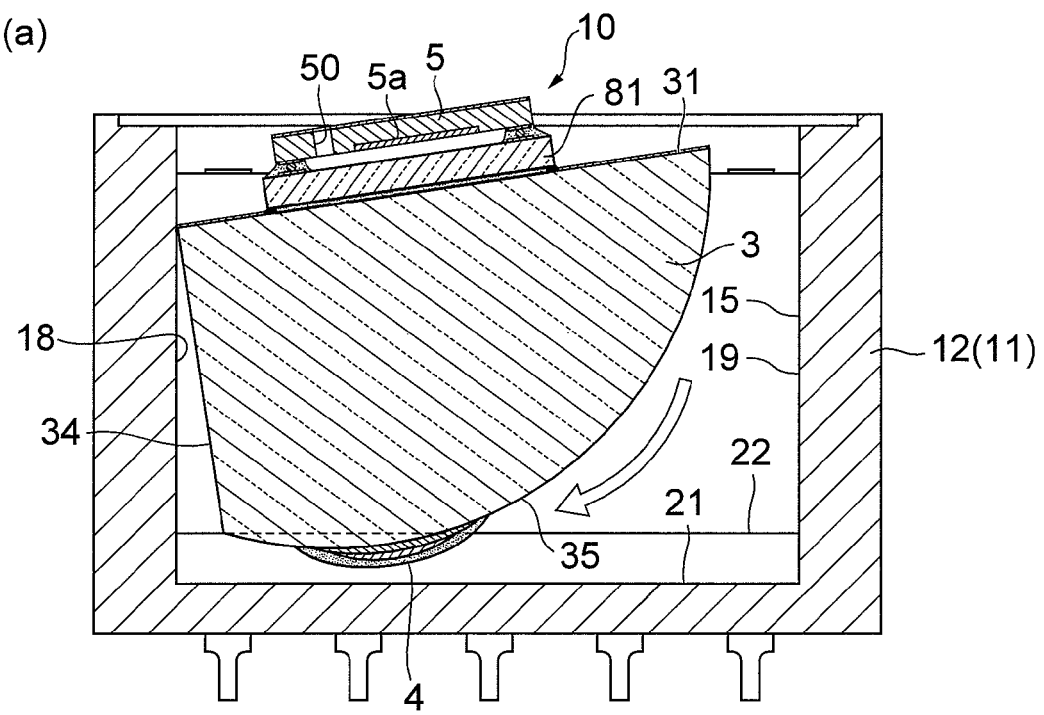
(b)
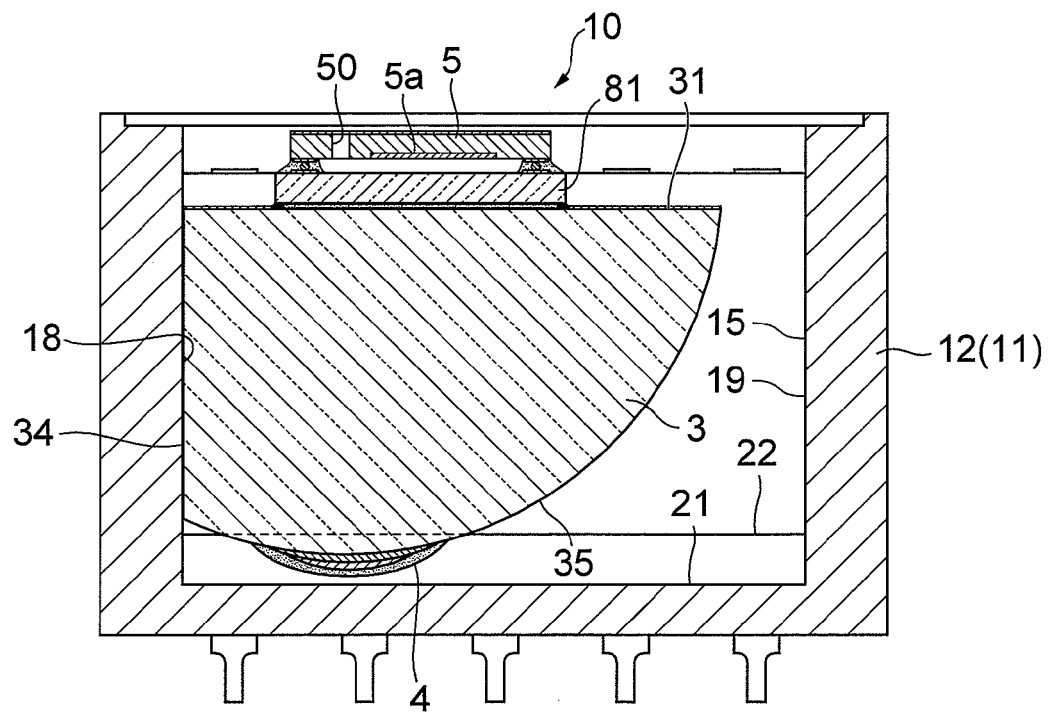

Fig.9
(a)
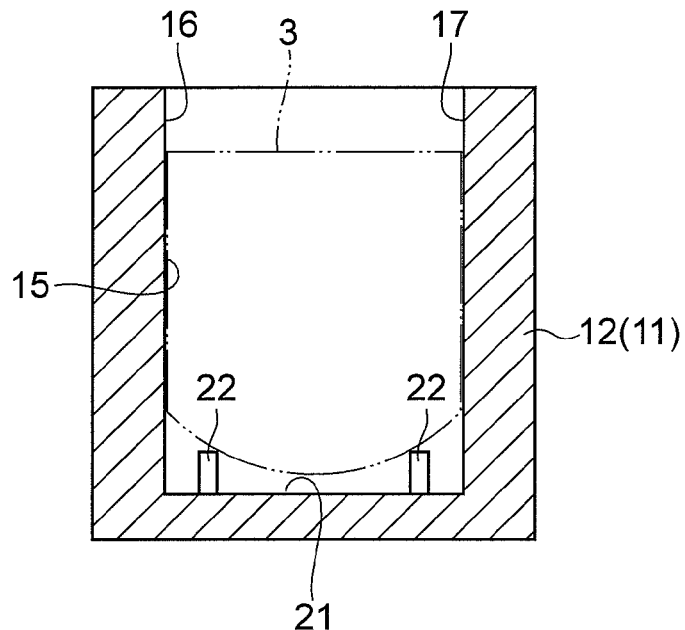
(b)
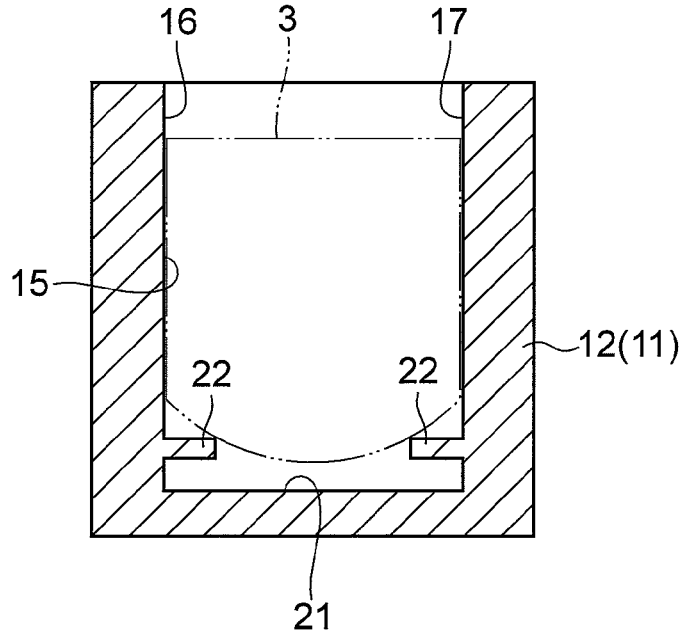

Fig.13
(a)
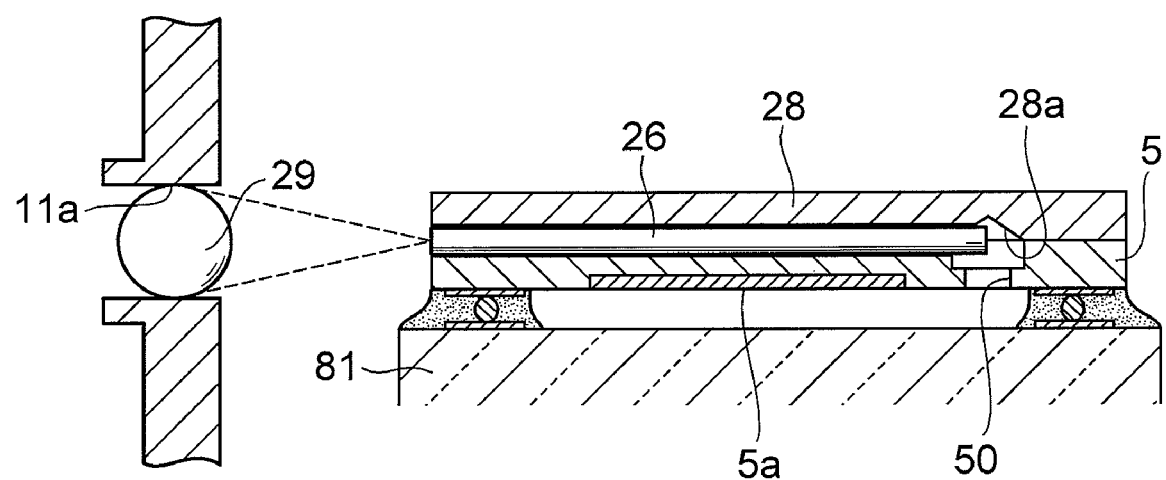
(b)
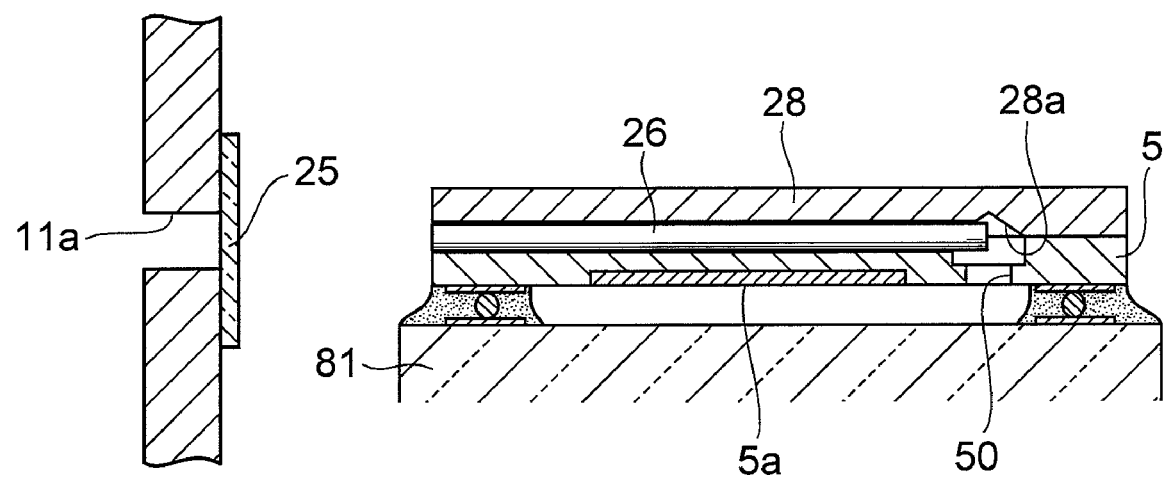

SPECTROMETER

BACKGROUND OF THE INVENTION

1. Field of the Invention

The present invention relates to a spectrometer configured such that a spectroscopic portion and a light detecting element are housed in a package.

2. Related Background of the Invention

A spectrometer is an apparatus in which a light to be measured is dispersed by a spectroscopic portion such as a prism or a diffraction grating, to detect the light by a light detecting element. Japanese Published Unexamined Patent Application No. H08-145794 (Patent Document 1) has disclosed a spectrometer provided with an optical bench on which various optical elements are mounted and a vessel that houses the optical bench. In this spectrometer, the optical bench has an element attachment portion to which the optical elements are attached and a vessel fixing portion fixed to the vessel, and the element attachment portion is formed to have a cantilever structure with respect to the vessel fixing portion.

SUMMARY OF THE INVENTION

Meanwhile, in recent years, the development of a spectrometer whose package for housing a spectroscopic portion and a light detecting element is downsized has been encouraged. On the other hand, a spectrometer in which a spectroscopic portion and a light detecting element are positioned with high precision with respect to a light incident portion of a package has been desired.

The present invention has been achieved in consideration of the above-described circumstances, and an object of the present invention is to provide a spectrometer in which it is possible to realize not only downsizing of a package housing a spectroscopic portion and a light detecting element, but also positioning of the spectroscopic portion and the light detecting element with high precision with respect to a light incident portion of the package.

In order to achieve the above-described object, a spectrometer according to the present invention is provided with a body portion through which light is allowed to transmit, a spectroscopic portion that disperses a light made incident into the body portion from a side of a predetermined plane of the body portion, and reflects lights to the side of the predetermined plane, a light detecting element which is disposed on the predetermined plane, and detects the lights dispersed by the spectroscopic portion, and a package which has a light incident portion through which a light advancing to the spectroscopic portion is made incident into the inside of the package, and houses the body portion, the spectroscopic portion and the light detecting element, and in the spectrometer, the body portion has a first plane surface substantially perpendicular to the predetermined plane, a second plane surface substantially perpendicular to the predetermined plane and the first plane surface, and a curved surface which is provided with the spectroscopic portion, and intersects with the predetermined plane, the first plane surface, and the second plane surface, and the package has a first inner wall surface coming into planar-contact with the first plane surface, a second inner wall surface coming into planar-contact with the second plane surface, and contact portions coming into contact with the curved surface.

In this spectrometer, the body portion having the curved surface on which the spectroscopic portion is provided and the predetermined plane in which the light detecting element is disposed, has the first plane surface substantially perpendicular to the predetermined plane, and the second plane surface substantially perpendicular to the predetermined plane and the first plane surface. Then, the package housing the body portion, the spectroscopic portion and the light detecting element has the first inner wall surface coming into planar-contact with the first plane surface of the body portion, the second inner wall surface coming into planar-contact with the second plane surface of the body portion, and the contact portions coming into contact with the curved surface of the body portion. Therefore, while bringing the curved surface of the body portion into contact with the contact portions of the package, the first plane surface of the body portion is brought into planar-contact with the first inner wall surface of the package, and the second plane surface of the body portion is brought into planar-contact with the second inner wall surface of the package, that positions the spectroscopic portion and the light detecting element with respect to the light incident portion of the package. Therefore, according to the spectrometer, it is possible to realize not only downsizing of the package housing the spectroscopic portion and the light detecting element, but also positioning of the spectroscopic portion and the light detecting element with high precision with respect to the light incident portion of the package.

In the spectrometer according to the present invention, the first plane surface is preferably formed to be substantially parallel to an array direction of grating grooves of the spectroscopic portion, and the second plane surface is preferably formed to be substantially vertical to the array direction of the grating grooves. According to this configuration, not only is the spectroscopic portion positioned with respect to the light incident portion of the package, but also the array direction of the grating grooves of the spectroscopic portion is specified with respect to the light incident portion of the package. Therefore, it is possible to precisely know a position of the spectroscopic portion and an array direction of the grating grooves of the spectroscopic portion on the basis of the light incident portion of the package.

In the spectrometer according to the present invention, the contact portions are preferably formed so as to be located on both sides of the spectroscopic portion in a direction substantially perpendicular to the first plane surface. According to this configuration, it is possible to reliably support the body portion at a predetermined position and at a predetermined angle with respect to the package while preventing damage generation of the spectroscopic portion.

In the spectrometer according to the present invention, the package is preferably composed of a light absorbing material. Further, a light absorbing film is preferably formed on the first plane surface and the second plane surface. According to these configurations, it is possible to prevent generation of stray light due to zero-order light or unnecessary-order light being made incident into the first plane surface and the second plane surface, to be reflected or diffused.

BRIEF DESCRIPTION OF THE DRAWINGS

FIG. 7 are diagrams for explanation of a disposition of the spectroscopy module with respect to a housing in the spectrometer of FIG. 1.

FIG. 9 are longitudinal sectional views of housings as yet other embodiments of the spectrometer according to the present invention.

FIG. 13 are enlarged longitudinal sectional views of peripheries of light incident portions as other embodiments of the spectrometer according to the present invention.

DESCRIPTION OF THE PREFERRED EMBODIMENTS

Figure 1:
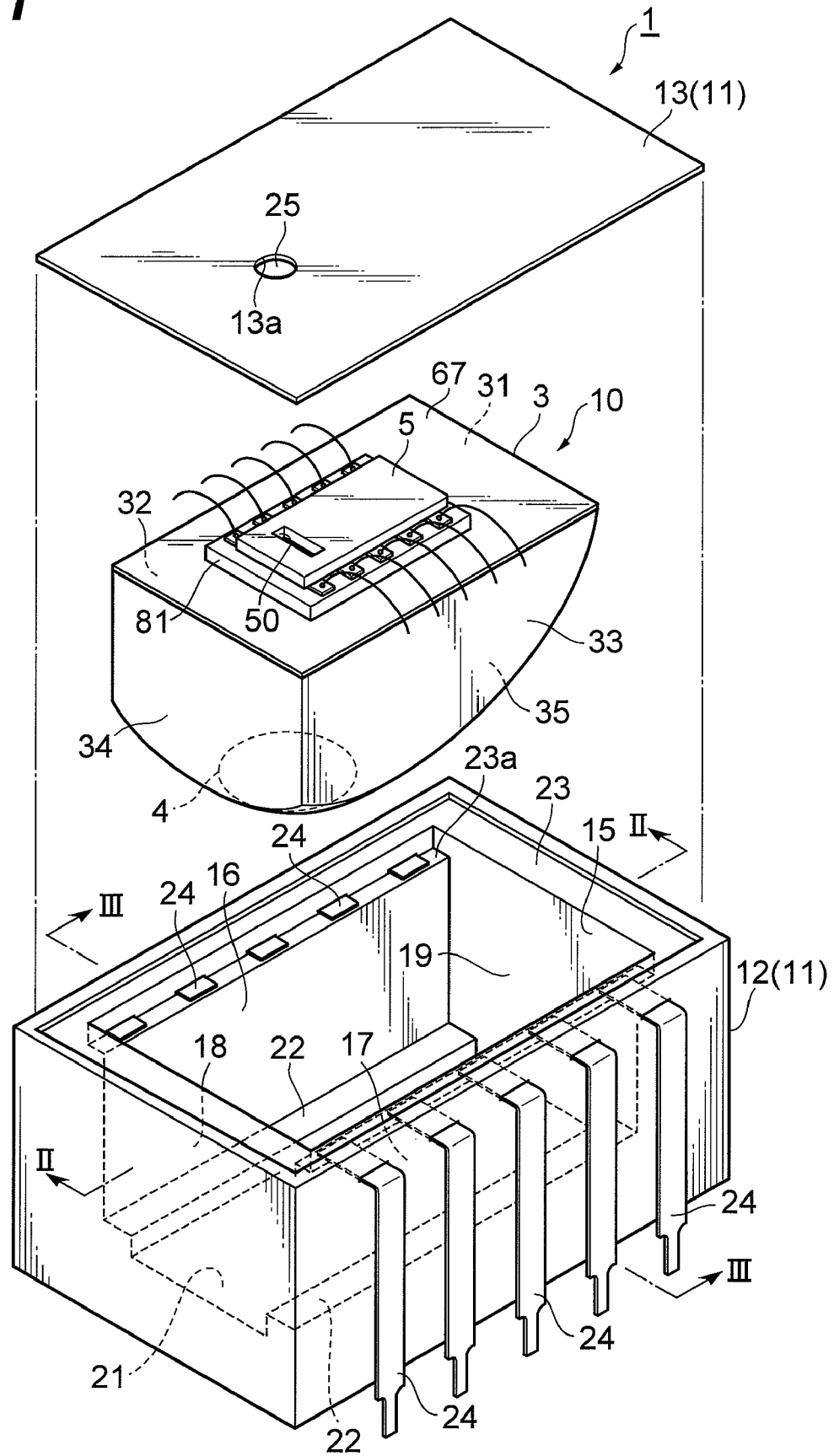
FIG. 1 is an exploded perspective view of one embodiment of a spectrometer according to the present invention.

Hereinafter, preferred embodiments of the present invention will be described in detail with reference to the drawings. In addition, the same or corresponding portions in the respective drawings are denoted by the same reference numerals, and overlapping descriptions thereof will be omitted.

Figure 2:
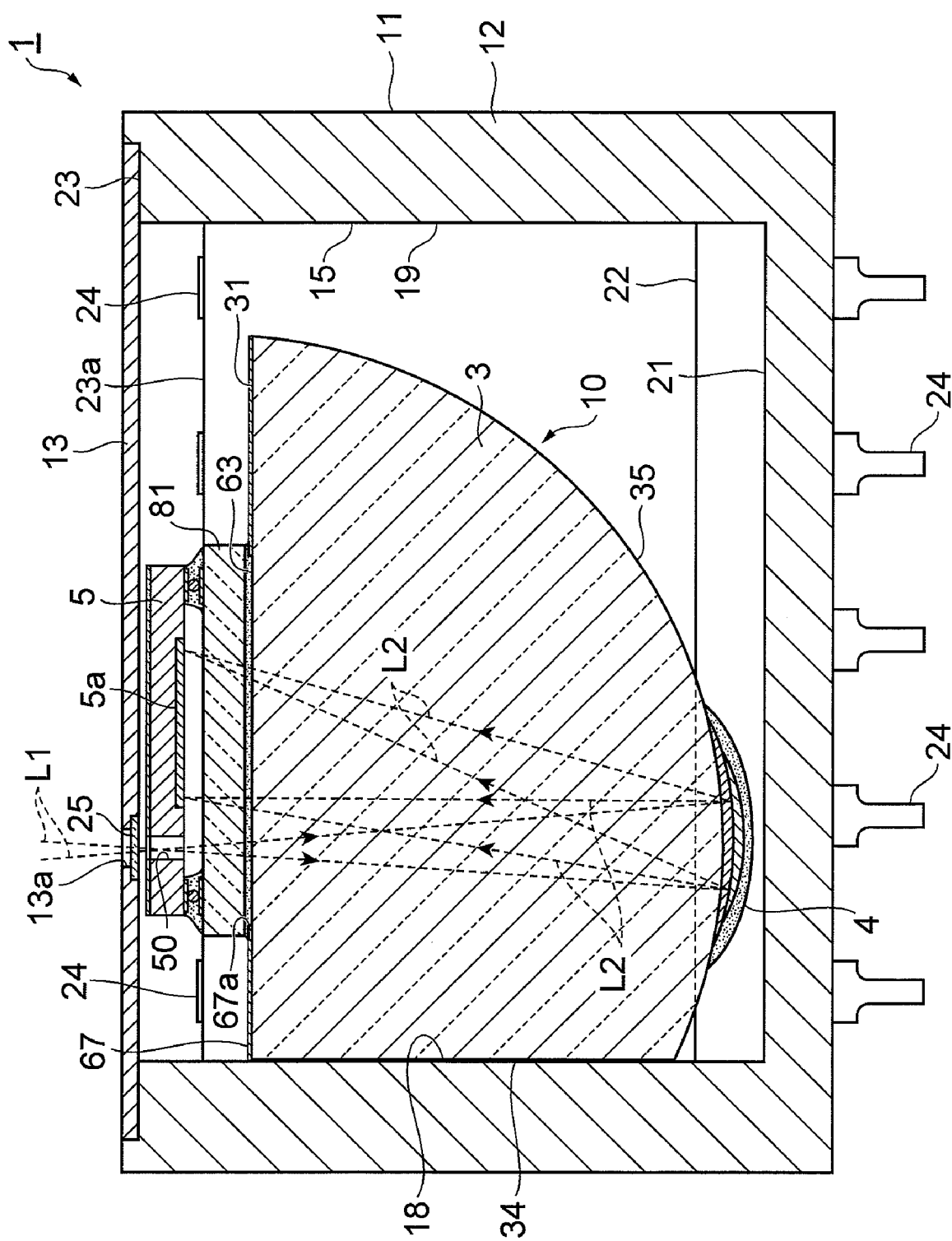
FIG. 2 is a cross sectional view taken along the line II to II shown in FIG. 1.
Figure 3:
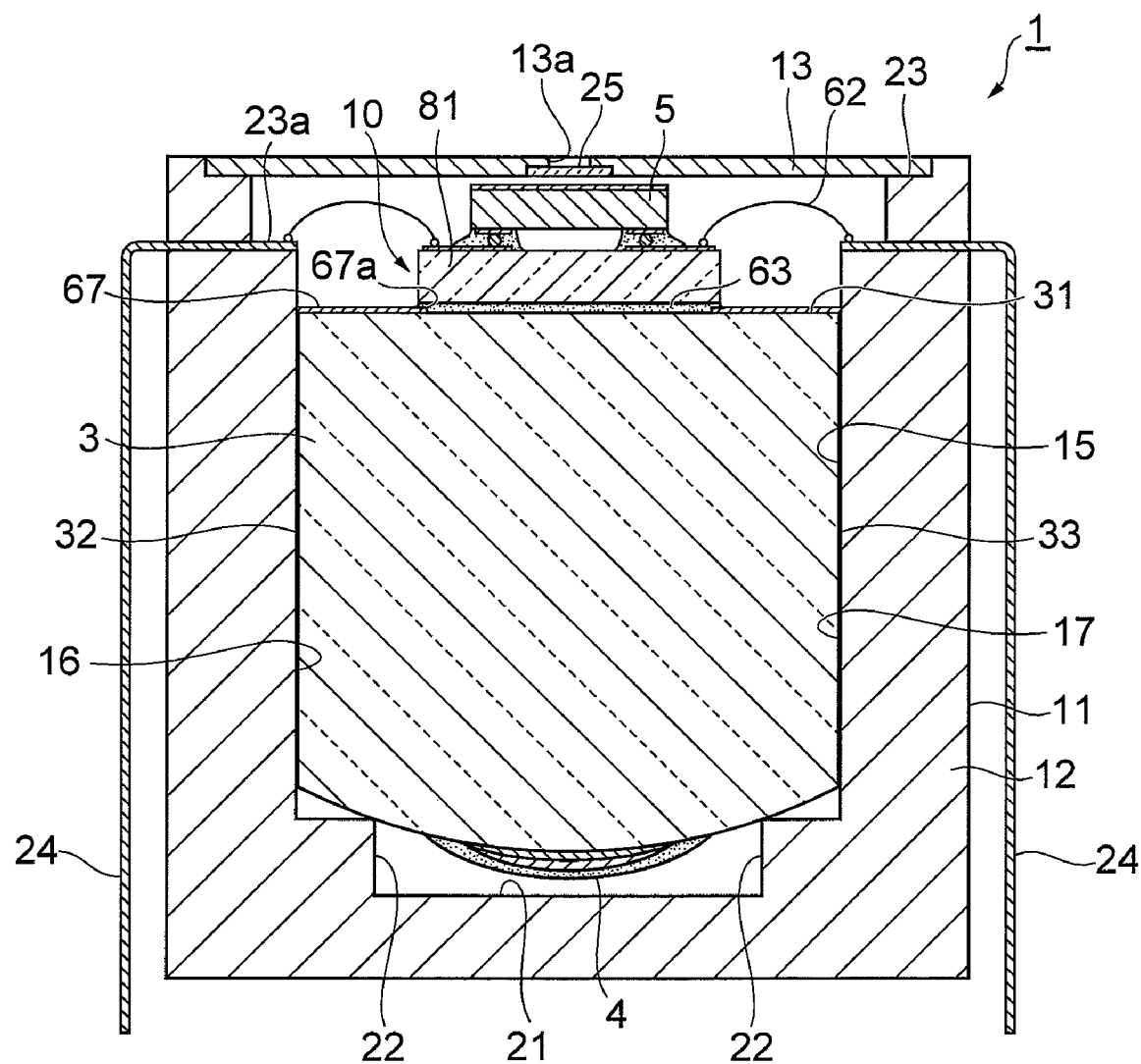
FIG. 3 is a cross sectional view taken along the line III to III shown in FIG. 1.

FIG. 1 is an exploded perspective view of one embodiment of a spectrometer according to the present invention, and FIGS. 2 and 3 are cross sectional views respectively taken along the lines II to II and III to III shown in FIG. 1. As shown in FIGS. 1 to 3, a spectrometer 1 is provided with a lens portion (body portion) 3 through which a light L1 made incident from a side of a bottom plane (predetermined plane) 31 is allowed to transmit, a spectroscopic portion 4 that disperses the light L1 made incident into the lens portion 3 to reflect the light toward the bottom plane 31, a light detecting element 5 that detects lights L2 dispersed by the spectroscopic portion 4, and a package 11 that houses the lens portion 3, the spectroscopic portion 4, and the light detecting element 5. In addition, the lens portion 3, the spectroscopic portion 4, and the light detecting element 5 are unitized, to compose a spectroscopy module 10.

The package 11 has a rectangular parallelepiped shaped housing 12 and a rectangular plate shaped lid body 13. The housing 12 and the lid body 13 are composed of light absorbing materials such as resin or ceramic having light absorption property. A light incident hole 13a is formed in the lid body 13, and a light incident window plate (light incident portion) 25 through which the light L1 advancing to the spectroscopic portion 4 is made incident into the inside of the package 11 is fixed to the light incident hole 13a. A cross-sectionally rectangular shaped concave portion 23 into which the lid body 13 is fitted is formed in the housing 12, and a cross-sectionally rectangular shaped concave portion 15 in which the spectroscopy module 10 is disposed is formed in the bottom plane of the concave portion 23.

The concave portion 15 is formed so that a side plane (first inner wall surface) 16 and a side plane 17 are made substantially parallel to one another, and a side plane (second inner wall surface) 18 and a side plane 19 are made substantially parallel to one another. That is, the side plane 16 and the side plane 18 are substantially perpendicular to one another. In addition, when the housing 12 is integrally molded by injection molding or the like, draft angles may be generated on the side planes 16 to 19 in some cases. However, it is assumed that a certain degree of draft angle is included in the definition that the side plane 16 and the side plane 18 are substantially perpendicular to one another.

Rectangular parallelepiped shaped contact portions 22 are integrally formed on a line of intersection of a bottom plane 21 of the concave portion 15 and the side plane 16 and on a line of intersection of the bottom plane 21 and the side plane 17. Further, notch portions 23 are formed in step form with respect to the respective side planes 16 and 17 in the opening portion of the concave portion 15. Base terminal portions of a plurality of lead wires 24 buried in the housing 12 are exposed on the respective notch portions 23a, and the leading end portions of the respective lead wires 24 are extended to the outside of the housing 12.

Figure 4:
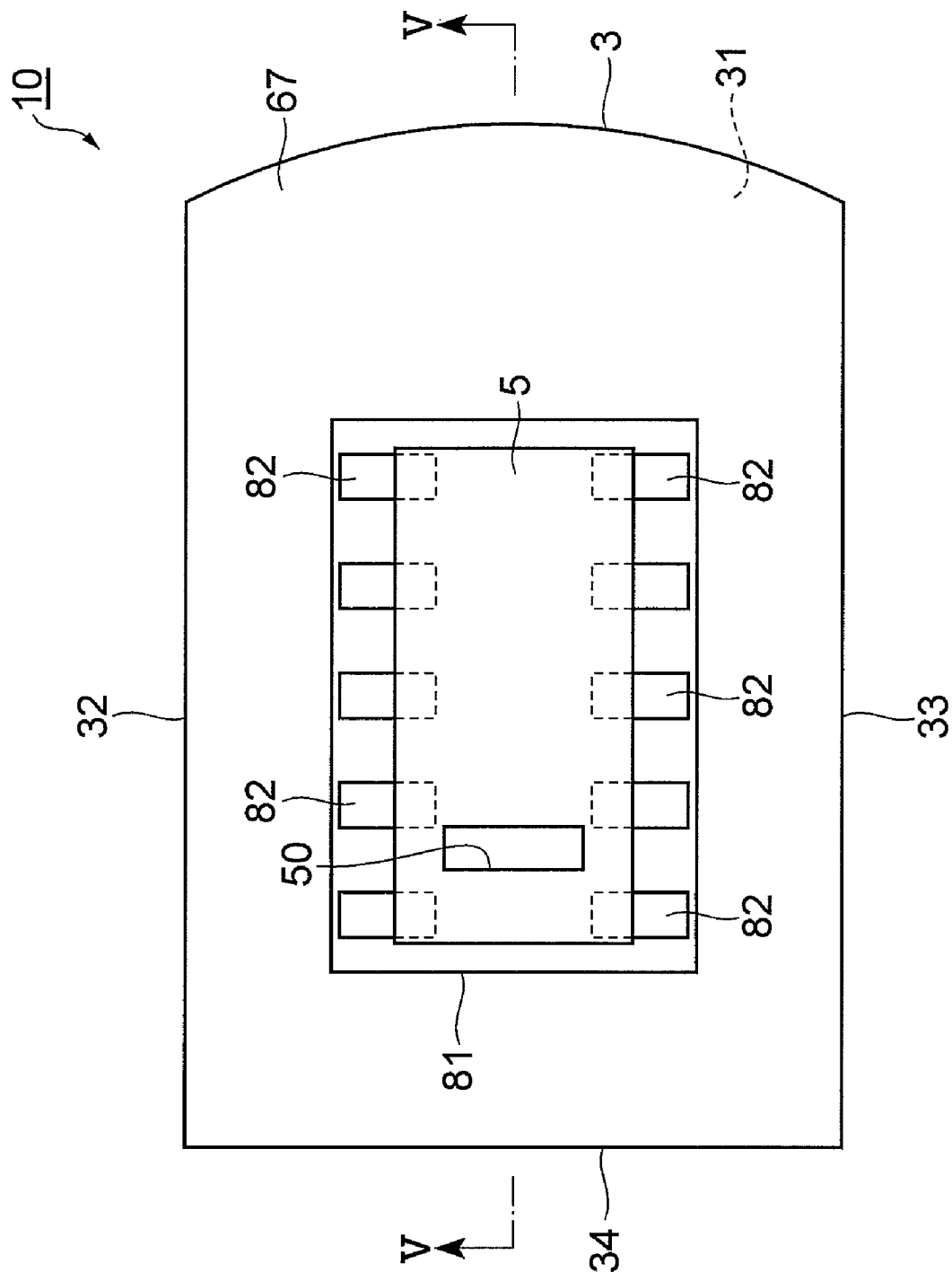
FIG. 4 is a plan view of a spectroscopy module of FIG. 1.
Figure 5:
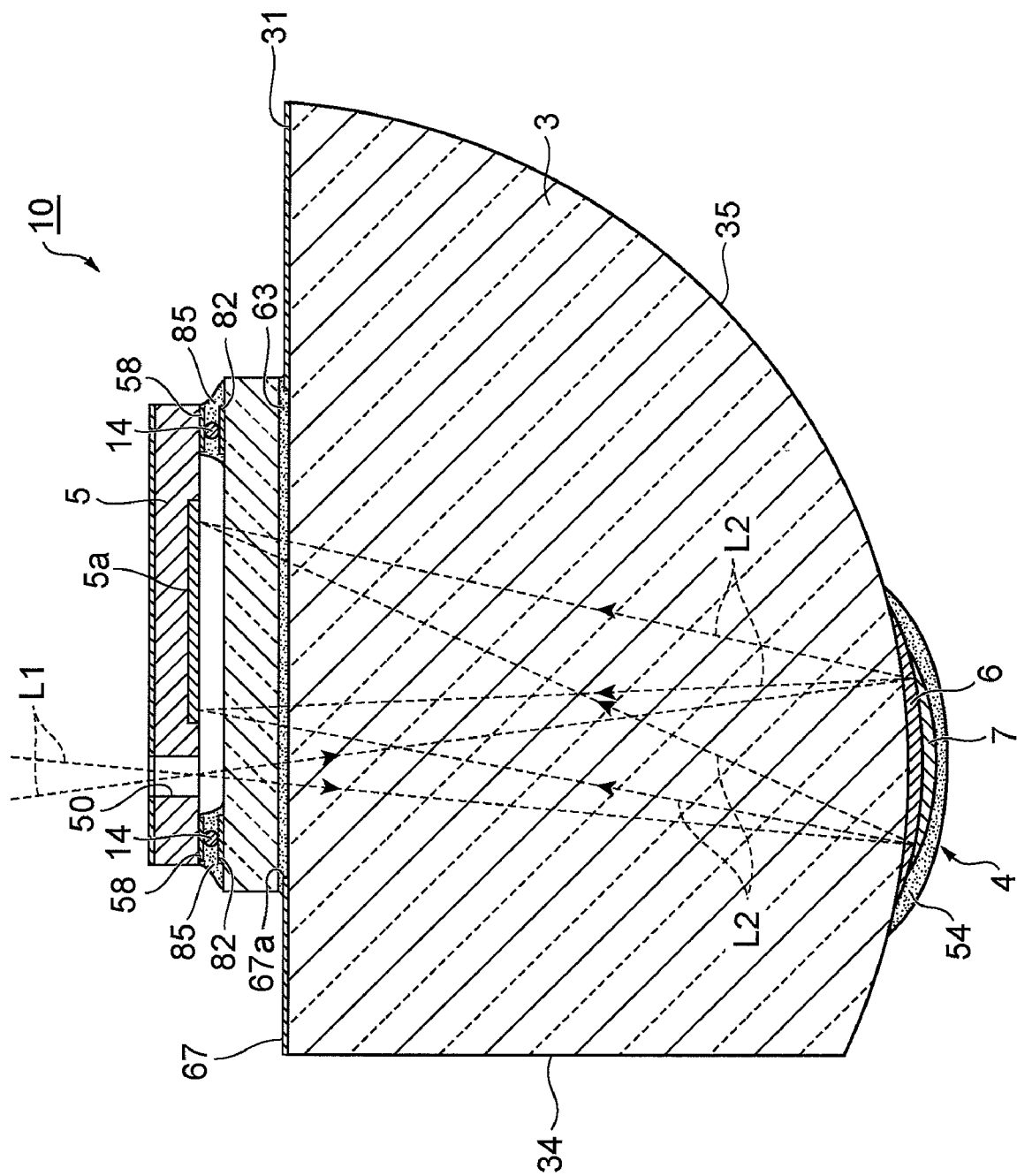
FIG. 5 is a cross sectional view taken along the line V to V shown in FIG. 4.
Figure 6:
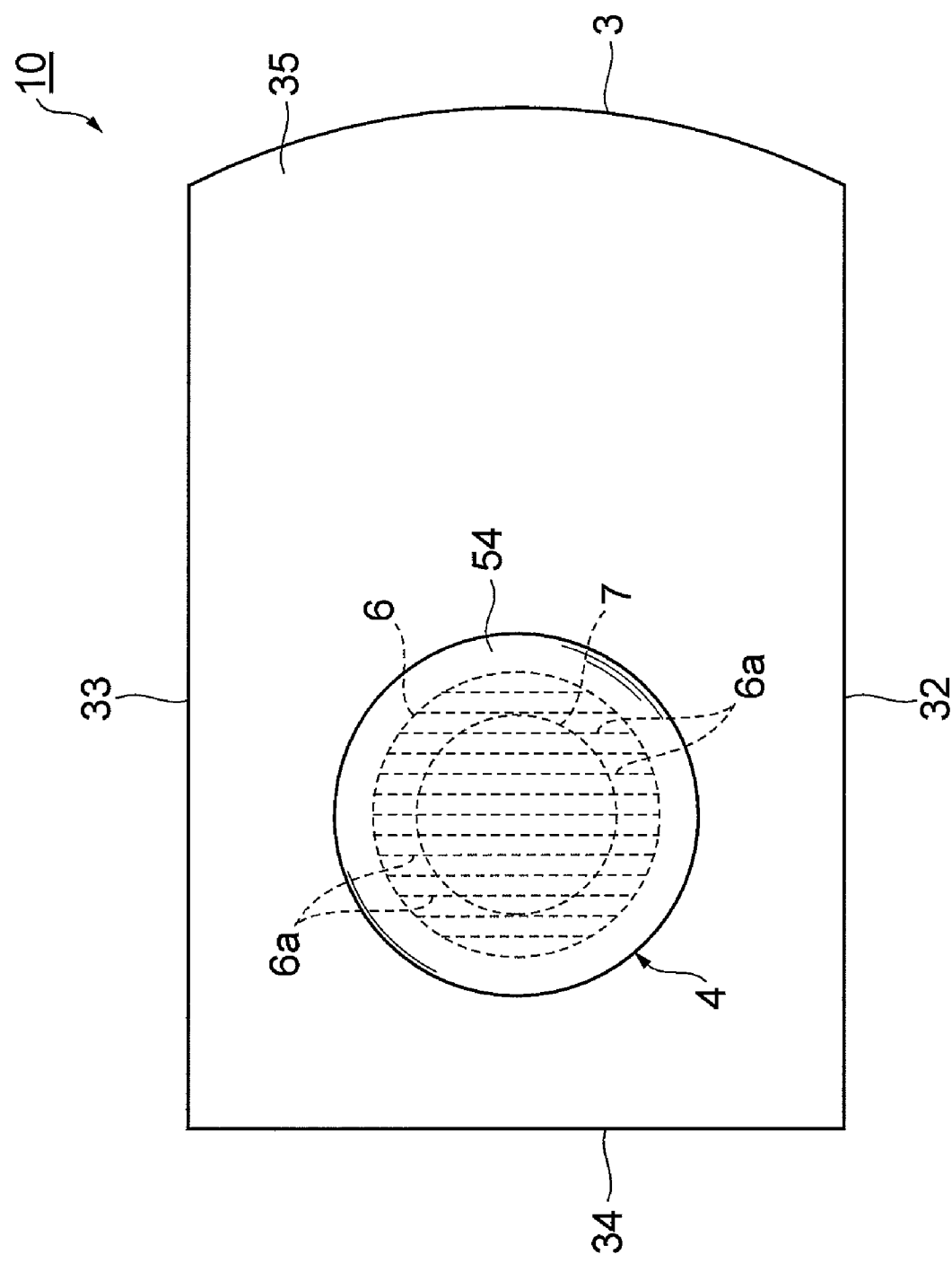
FIG. 6 is a bottom view of the spectroscopy module of FIG. 1.

Here, a configuration of the spectroscopy module 10 will be described. FIG. 4 is a plan view of the spectroscopy module of FIG. 1, and FIG. 5 is a cross sectional view taken along the line V to V shown in FIG. 4. FIG. 6 is a bottom view of the spectroscopy module of FIG. 1.

As shown in FIGS. 4 to 6, the lens portion 3 is formed into a shape such that a semispherical lens is cut off along two planes substantially perpendicular to the bottom plane 31 and substantially parallel to each other and along one plane substantially perpendicular to the two planes and the bottom plane 31 (with, for example, a curvature radius of 6 to 10 mm, an entire length of the bottom plane 31 of 5 to 15 mm, a full width of the bottom plane 31 of 6 to 10 mm, and a height of 5 to 8 mm), from light-transmitting glass such as BK7, Pyrex (registered trademark), or quartz, plastic, or the like. That is, the lens portion 3 has a side plane (first plane) 32 and a side plane 33 substantially perpendicular to the bottom plane 31 and substantially parallel to each other, a side plane (second plane) 34 substantially perpendicular to the bottom plane 31 and the side planes 32 and 33, and a spherical surface (curved surface) 35 intersecting with the bottom plane 31 and the side planes 32 to 34.

The spectroscopic portion 4 is provided onto the top portion of the spherical surface 35 of the lens portion 3. The spectroscopic portion 4 is a reflection type grating having a diffraction layer 6 formed on the spherical surface 35, a reflection layer 7 formed on the outer surface of the diffraction layer 6, and a passivation layer 54 that covers the outer surfaces of the diffraction layer 6 and the reflection layer 7. The diffraction layer 6 is formed so that a plurality of grating grooves 6a are provided adjacent to each other along a direction substantially parallel to the side planes 32 and 33. That is, the side plane 32 of the lens portion 3 is formed to be substantially parallel to the array direction of the grating grooves 6a, and the side plane 34 of the lens portion 3 is formed to be substantially vertical to the array direction of the grating grooves 6a.

For example, a cross-sectionally serrated blazed grating, a cross-sectionally rectangular binary grating, a cross-sectionally sinusoidal holographic grating, or the like is applied as the diffraction layer 6, and the diffraction layer 6 is formed by subjecting optical resin for replica molding such as photo curing epoxy resin, acrylic resin, or organic-inorganic hybrid resin to photo curing. The reflection layer 7 is a membrane form, and is formed by, for example, evaporating Al, Au, or the like onto the outer surface of the diffraction layer 6. The passivation layer 54 is a membrane form, and is formed by, for example, evaporating $MgF_2$, $SiO_2$, or the like or applying resin onto the outer surfaces of the diffraction layer 6 and the reflection layer 7. In addition, an optical NA of the spectroscopy module 10 can be adjusted by adjusting an area on which the reflection layer 7 is formed. Further, the lens portion 3 and the diffraction layer 6 composing the spectroscopic portion 4 may be formed integrally from the above-described material.

An intermediate substrate 81 is bonded to the bottom plane 31 of the lens portion 3 with an optical resin adhesive 63 through which the lights L1 and L2 are allowed to transmit. The intermediate substrate 81 is formed into a rectangular plate shape from light-transmitting glass such as BK7, Pyrex (registered trademark), or quartz, plastic, or the like, that allows the lights L1 and L2 to transmit through it. In addition, a light absorption layer 67 having a light passing opening 67a through which the lights L1 and L2 pass is formed on the bottom plane 31 of the lens portion 3. As a material of the light absorption layer 67, colored resin (silicone, epoxy, acrylic, urethane, polyimide, or composite resin, or the like) containing black resist or a filler (such as carbon or oxide), metal such as Cr or Co or metal oxide thereof, or a laminated film thereof, or porous-type ceramic, metal, or metal oxide, can be cited.

The light detecting element 5 is disposed on the front plane of the intermediate substrate 81. The light detecting element 5 is formed into a rectangular plate shape (with, for example, an entire length of 5 to 10 mm, a full width of 1.5 to 3 mm, and a thickness of 0.1 to 0.8 mm), and a light detection portion 5a is formed on the plane at the side of the spectroscopic portion 4 of the light detecting element 5. The light detection portion 5a is a CCD image sensor, a PD array, or a CMOS image sensor or the like, and is formed so that a plurality of channels are arrayed in a direction substantially perpendicular to the direction in which the grating grooves 6a of the spectroscopic portion 4 are extended (i.e., the direction in which the grating grooves 6a are provided adjacent to each other).

Further, a light passing hole 50 through which the light L1 advancing to the spectroscopic portion 4 passes, that is provided adjacent to the light detection portion 5a in the array direction of their channels, is formed in the light detecting element 5. The light passing hole 50 is a slit (with, for example, a length of 0.5 to 1 mm and a width of 10 to 100 μm) which is extended in a direction substantially perpendicular to the array direction of the channels of the light detection portion 5a, and is formed by etching or the like so as to be positioned with high precision with respect to the light detection portion 5a.

Moreover, a plurality of electrodes 58 composed of a metal material, are provided onto the plane at the side of the spectroscopic portion 4 of the light detecting element 5. Wirings 82 composed of a metal material are provided on the front plane of the intermediate substrate 81 so as to correspond to the respective electrodes 58, and the electrodes 58 and the wirings 82 which correspond to one another are electrically connected via bumps 14. In addition, a resin adhesive 85 is applied onto a region except for light paths for the lights L1 and L2 between the intermediate substrate 81 and the light detecting element 5, so as to cover the bumps 14 in order to improve the connection strength between the intermediate substrate 81 and the light detecting element 5.

The spectroscopy module 10 configured as described above is disposed in the concave portion 15 of the housing 12 as shown in FIGS. 1 to 3. At this time, the side plane 32 of the lens portion 3 comes into planar-contact with the side plane 16 of the concave portion 15, and the side plane 34 of the lens portion 3 comes into planar-contact with the side plane 18 of the concave portion 15. Moreover, the spherical surface 35 of the lens portion 3 comes into contact with the contact portions 22 formed so as to be located on both sides of the spectroscopic portion 4 in a direction substantially perpendicular to the side plane 32 of the lens portion 3. Then, in this state, the lid body 13 is fitted into the concave portion 23 of the housing 12 (at this time, the light incident window plate 25 of the lid body 13 and the light passing hole 50 of the light detecting element 5 face each other), and the spectroscopy module 10 is housed in the package 11.

In addition, in a state in which the spectroscopy module 10 is disposed in the concave portion 15 of the housing 12, the respective wirings 82 of the intermediate substrate 81 are electrically connected to the base terminal portions of the lead wires 24 exposed on the notch portions 23a with wires 62. Thereby, electric signals generated in the light detection portion 5a of the light detecting element 5 are led to the outside via the electrodes 58, the bumps 14, the wirings 82 of the intermediate substrate 81, the wires 62, and the lead wires 24.

In the spectrometer 1 configured as described above, the light L1 is made incident into the lens portion 3 from the side of the bottom plane 31 of the lens portion 3 via the light incident window plate 25 of the package 11, the light passing hole 50 of the light detecting element 5, the intermediate substrate 81, and the light passing opening 67a of the light absorption layer 67 and the optical resin adhesive 63, and advances inside the lens portion 3 to reach the spectroscopic portion 4. The light L1 which has reached the spectroscopic portion 4 is dispersed into a plurality of lights L2 by the spectroscopic portion 4. The dispersed lights L2 are reflected toward the bottom plane 31 of the lens portion 3 by the spectroscopic portion 4, and advance inside the lens portion 3 to reach the light detection portion 5a of the light detecting element 5 via the light passing opening 67a of the light absorption layer 67 and the optical resin adhesive 63, and the intermediate substrate 81. The lights L2 which have reached the light detection portion 5a are detected by the light detecting element 5.

A method for manufacturing the spectrometer 1 described above will be described.

First, after the light absorption layer 67 is formed on the bottom plane 31 of the lens portion 3, the light passing opening 67a is formed so as to eliminate a part of the light absorption layer 67 by photolithography, and the spectroscopic portion 4 is formed on the spherical surface 35 of the lens portion 3. Meanwhile, the intermediate substrate 81 onto which the wirings 82 are provided and the light detecting element 5 in which the light passing hole 50 is formed are prepared, and the respective electrodes 58 of the light detecting element 5 serving as the terminal electrodes are electrically connected to the corresponding wirings 82 of the intermediate substrate 81 via the bumps 14, and the resin adhesive 85 is applied from the sides so as to cover the bumps 14. Next, the intermediate substrate 81 onto which the light detecting element 5 is mounted is bonded to the portion of the light passing opening 67a in the bottom plane 31 of the lens portion 3 with the optical resin adhesive 63, to obtain the spectroscopy module 10.

In addition, in detail, the spectroscopic portion 4 is formed as follows. That is, a light-transmitting master grating on which gratings corresponding to the diffraction layer 6 are engraved is pushed onto the optical resin for replica molding falling in drops near the top portion of the spherical surface 35 of the lens portion 3. Then, the optical resin for replica molding is subjected to light in this state to cure the optical resin for replica molding, and the optical resin for replica molding is preferably subjected to thermal curing for stabilization, to form the diffraction layer 6 having the plurality of grating grooves 6a. Thereafter, the master grating is demolded, and the reflection layer 7 is formed by evaporating Al, Au, or the like onto the outer surface of the diffraction layer 6. Moreover, the passivation layer 54 is formed by evaporating $MgF_2$, $SiO_2$, or the like onto the outer surfaces of the diffraction layer 6 and the reflection layer 7.

After the spectroscopy module 10 is obtained, the spectroscopy module 10 is disposed in the concave portion 15 of the housing 12. In detail, as shown in FIG. 7, the spectroscopy module 10 is inclined such that its opposite side of the side plane 34 of the lens portion 3 is raised higher than the side of the side plane 34 of the lens portion 3, and the spherical surface 35 of the lens portion 3 is brought into contact with the contact portions 22 such that the contact portions 22 of the concave portion 15 are located on both sides of the spectroscopic portion 4 in a direction substantially perpendicular to the side plane 32 of the lens portion 3. Then, while bringing the spherical surface 35 of the lens portion 3 into contact with the contact portions 22, the spectroscopy module 10 is made to slide by using the contact portions 22 as guides, to bring the side plane 32 of the lens portion 3 into planar-contact with the side plane 16 of the concave portion 15, and bring the side plane 34 of the lens portion 3 into planar-contact with the side plane 18 of the concave portion 15.

Next, the wirings 82 of the intermediate substrate 81 and the base terminal portions of the lead wires 24 which correspond to one another are electrically connected to one another with the wires 62. Finally, the lid body 13 is fitted into the concave portion 23 of the housing 12 to join those to be airtight, to obtain the spectrometer 1 in which the spectroscopy module 10 is housed in the package 11.

As described above, in the spectrometer 1, the lens portion 3 having the spherical surface 35 on which the spectroscopic portion 4 is provided and the bottom plane 31 in which the light detecting element 5 is disposed, has the side plane 32 substantially perpendicular to the bottom plane 31 and the side plane 34 substantially perpendicular to the bottom plane 31 and the side plane 32. Then, the package 11 that houses the spectroscopy module 10 composed of the lens portion 3, the spectroscopic portion 4, and the light detecting element 5 which are unitized, has the side plane 16 coming into planar-contact with the side plane 32 of the lens portion 3, the side plane 18 coming into planar-contact with the side plane 34 of the lens portion 3, and the contact portions 22 coming into contact with the spherical surface 35 of the lens portion 3. Therefore, while bringing the spherical surface 35 of the lens portion 3 into contact with the contact portions 22 of the package 11, the side plane 32 of the lens portion 3 is brought into planar-contact with the side plane 16 of the package 11, and the side plane 34 of the lens portion 3 is brought into planar-contact with the side plane 18 of the package 11, that positions the spectroscopic portion 4 and the light detecting element 5 with respect to the light incident window plate 25 of the package 11 (in particular, the accuracy of horizontality of the bottom plane 31 of the lens portion 3 is secured). Additionally, because the spectroscopic portion 4 does not come into contact with the package 11, damage generation of the spectroscopic portion 4 is prevented. Therefore, according to the spectrometer 1, it is possible to realize not only downsizing of the package 11 that houses the spectroscopic portion 4 and the light detecting element 5, but also positioning of the spectroscopic portion 4 and the light detecting element 5 with high precision with respect to the light incident window plate 25 of the package 11.

Further, the side plane 32 of the lens portion 3 is formed to be substantially parallel to the array direction of the grating grooves 6a of the spectroscopic portion 4, and the side plane 34 of the lens portion 3 is formed to be substantially vertical to the array direction of the grating grooves 6a of the spectroscopic portion 4. Thereby, not only is the spectroscopic portion 4 positioned with respect to the light incident window plate 25 of the package 11, but also the array direction of the grating grooves 6a of the spectroscopic portion 4 is specified with respect to the light incident window plate 25 of the package 11. Therefore, it is possible to precisely know a position of the spectroscopic portion 4 and an array direction of the grating grooves 6a of the spectroscopic portion 4 on the basis of the light incident window plate 25 of the package 11.

Further, the contact portions 22 of the package 11 are formed so as to be located on both sides of the spectroscopic portion 4 in a direction substantially perpendicular to the side plane 32 of the lens portion 3. Thereby, it is possible to reliably support the lens portion 3 at a predetermined position and at a predetermined angle with respect to the package 11 while preventing damage generation of the spectroscopic portion 4.

Moreover, because the package 11 is composed of a light absorbing material, it is possible to prevent generation of stray light due to zero-order light being made incident into the side planes 32 to 34 of the lens portion 3.

The present invention is not limited to the above-described embodiment.

Figure 8:
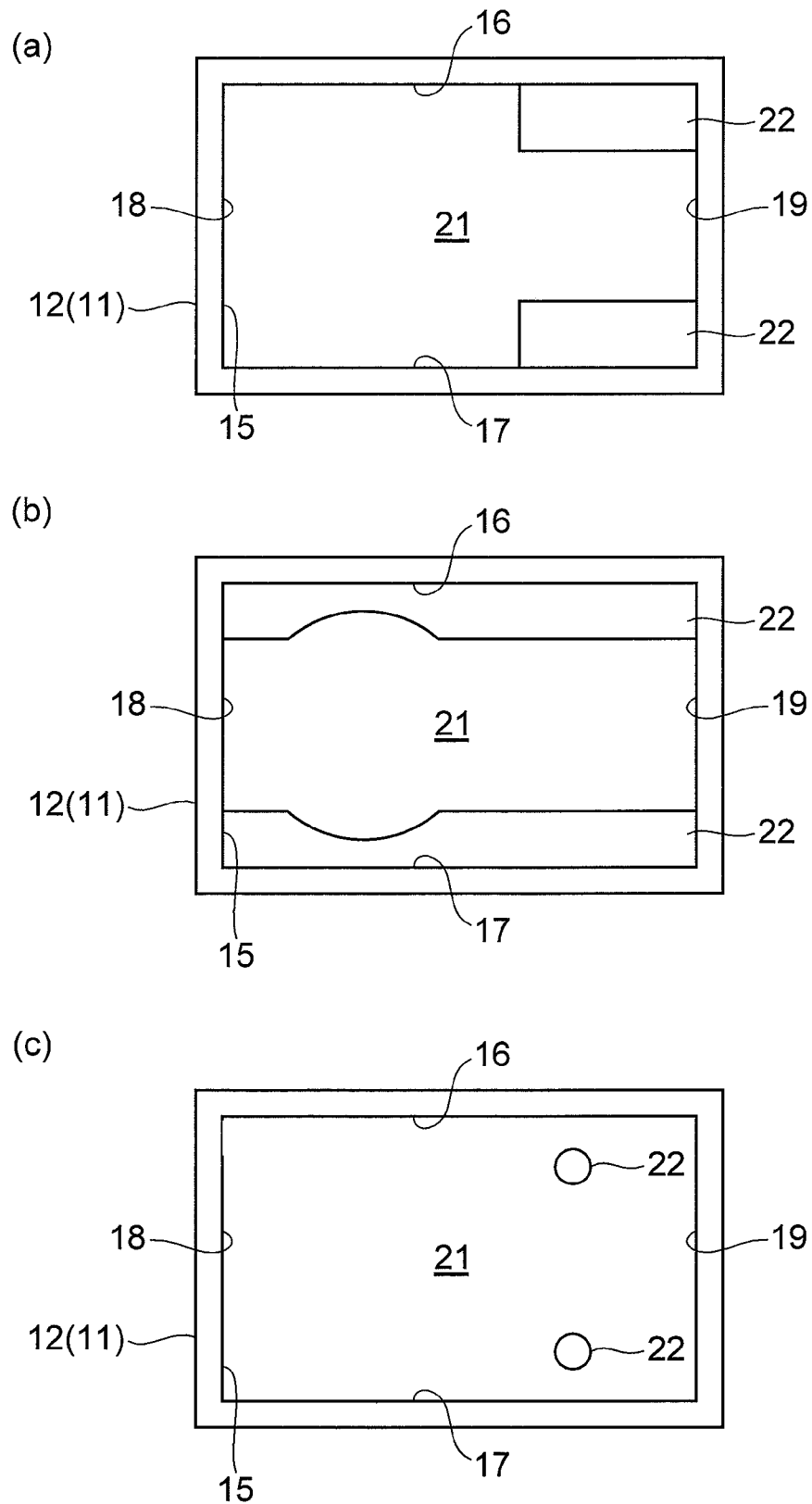
FIG. 8 are plan views of housings as other embodiments of the spectrometer according to the present invention.

For example, as shown in FIG. 8A, the contact portions 22 may not reach the side plane 19 from the side plane 18 of the concave portion 15, but may be partially formed on the line of intersection of the bottom plane 21 of the concave portion 15 and the side plane 16 and on the line of intersection of the bottom plane 21 and the side plane 17. Further, as shown in FIG. 8B, the contact portions 22 may be cut out so as to correspond to the spectroscopic portion 4. Moreover, as shown in FIG. 8C, the contact portions 22 may be formed to be columnar on the bottom plane 21 of the concave portion 15.

Further, as shown in FIGS. 9A and 9B, the contact portions 22 may be formed, not only on the line of intersection of the bottom plane 21 of the concave portion 15 and the side plane 16 and on the line of intersection of the bottom plane 21 and the side plane 17, but also on the bottom plane 21 of the concave portion 15 or the side planes 16 and 17. Moreover, the contact portions 22 may be formed separately from the housing 12, and may be fixed to the housing 12 by adhesion or the like. In addition, the planes with which the contact portions 22 come into contact in the lens portion 3 may be curved surfaces other than spherical surfaces.

The light incident portion that makes a light advancing to the spectroscopic portion incident into the package may be formed on a side wall of the package. According to such a spectrometer, for example, an optical fiber for guiding a light advancing to the spectroscopic portion can be made along the substrate onto which the spectrometer is mounted. Therefore, an attempt can be made to make handling of the optical fiber, i.e., mounting of the spectrometer onto the substrate easy, and to reduce its mounting space.

Figure 10:
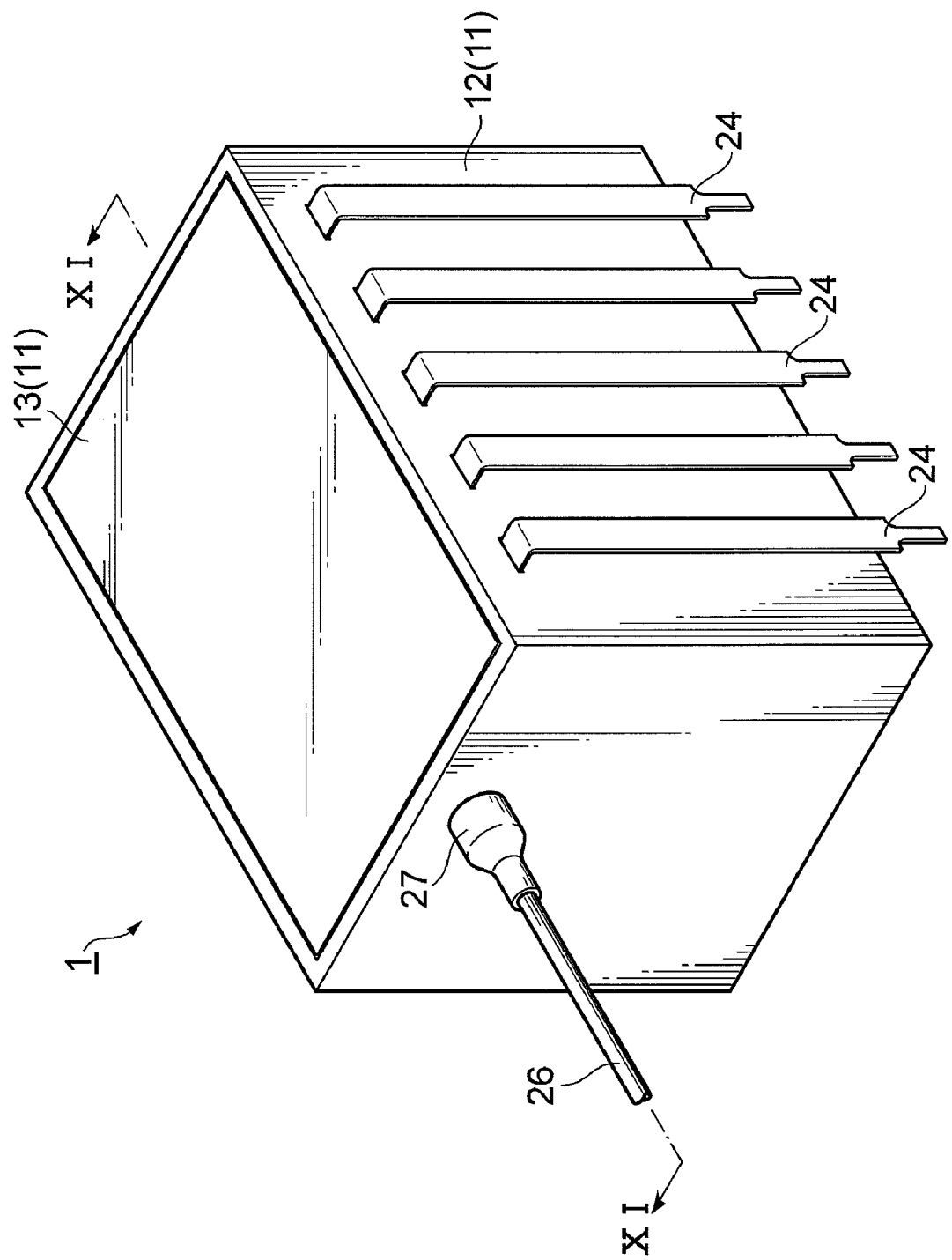
FIG. 10 is a perspective view as another embodiment of the spectrometer according to the present invention.
Figure 11:
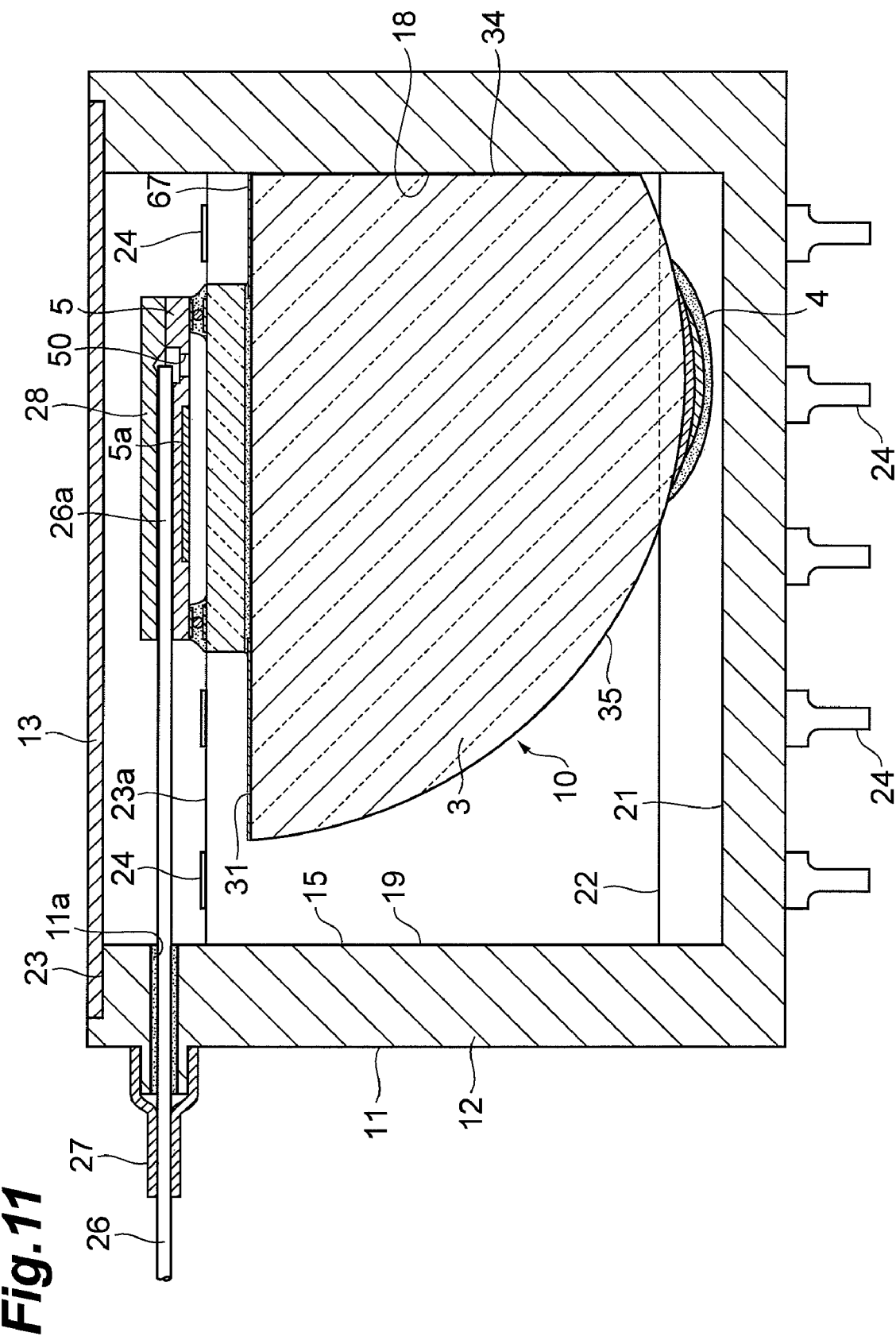
FIG. 11 is a cross sectional view taken along the line XI to XI shown in FIG. 10.

Here, one example of the spectrometer in which the light incident portion is formed onto a side wall of the package will be described. FIG. 10 is a perspective view as another embodiment of the spectrometer according to the present invention, and FIG. 11 is a cross sectional view taken along the line XI to XI shown in FIG. 10. As shown in FIGS. 10 and 11, an optical fiber (light incident portion) 26 for guiding the light L1 advancing to the spectroscopic portion 4 is inserted to pass through a through hole 11a formed in the side wall of the package 11 via a sleeve 27, to be fixed to be airtight. The optical fiber 26 is extended above the light detecting element 5, and an extended portion 26a thereof is held between the light detecting element 5 and a cover body 28.

Figure 12:
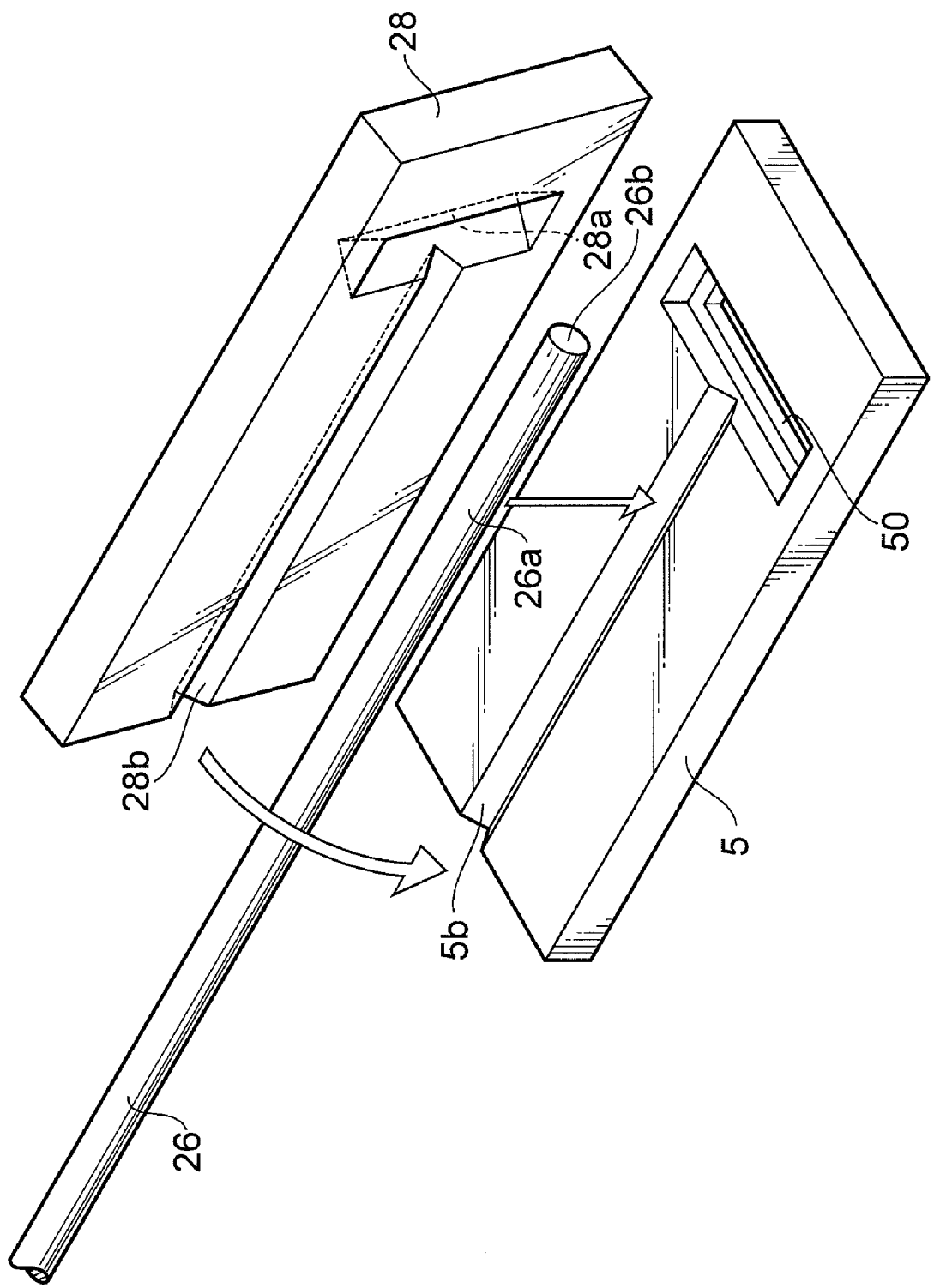
FIG. 12 is a perspective view of a light detecting element and a cover body of FIG. 10.

FIG. 12 is a perspective view of the light detecting element and the cover body of FIG. 10. As shown in FIG. 12, a V-groove 5b in which the extended portion 26a of the optical fiber 26 is disposed is formed in the light detecting element 5 by etching or the like, and a V-groove 28b in which the extended portion 26a of the optical fiber 26 is disposed is formed in the cover body 28 by etching or the like. A light reflection plane 28a that reflects the light L1 emitted from a light emission terminal 26b of the optical fiber 26 disposed in the V-groove 28b toward the light passing hole 50 of the light detecting element 5 is formed onto the cover body 28 by evaporating Al, Au, or the like. The light detecting element 5 and the cover body 28 are fixed to one another by adhesion or the like in a state in which the extended portion 26a of the optical fiber 26 is disposed in the V-grooves 5b and 28b, and the light emission terminal 26b of the optical fiber 26 faces the light reflection plane 28a.

FIG. 13 are enlarged longitudinal sectional views of peripheries of light incident portions as other embodiments of the spectroscopy module according to the present invention. As shown in FIG. 13A, a lens (light incident portion) 29 may be fixed to the through hole 11a of the package 11 to be airtight, to perform lens-coupling of the light L1 to the optical fiber 26 held between the light detecting element 5 and a cover body 28. Further, as shown in FIG. 13B, the light incident window plate 25 may be fixed to the through hole 11a of the package 11 to be airtight, and the light L1 may be made incident into the optical fiber 26 held between the light detecting element 5 and a cover body 28. In this way, provided that the lens 29 or the light incident window plate 25 is used as a light incident portion, it is possible to increase design freedom of the optical system including the spectrometer 1. Moreover, because it is easy to perform hermetic sealing with respect to the package 11, highly reliable packaging is possible.

Further, provided that a light absorbing film is formed on the side planes 32 to 34 of the lens portion 3, in the same way in the case in which the package 11 is composed of a light absorbing material, it is possible to prevent generation of stray light due to zero-order light or unnecessary-order light being made incident into the side planes 32 to 34, to be reflected or diffused. This effect is advantageous for, for example, a case in which the package 11 is composed of a metal material, or the like.

Further, the light passing hole 50 may not be formed in the light detecting element 5, but formed in the light absorption layer 67. Moreover, disposition of the light detecting element 5 onto the bottom plane 31 of the lens portion 3 and the like may be indirectly carried out via some members or the like, or may be directly carried out. Further, the present invention may be configured such that the lead wires 24 of the package 11 are bent toward the light incident window plate 25. In this case, the configuration may be applied to a case in which the mounting plane side of the spectrometer 1 is the light incident side (for example, in a case in which a hole is open in the mounting substrate, and light is guided from the hole, or the like).

According to the present invention, it is possible to realize not only downsizing of the package that houses the spectroscopic portion and the light detecting element, but also positioning of the spectroscopic portion and the light detecting element with high precision with respect to the light incident portion of the package.

What is claimed is:

1. A spectrometer comprising:
    a body portion through which light is allowed to transmit;
    a spectroscopic portion that disperses a light made incident into the body portion from a side of a predetermined plane of the body portion, and reflects lights to the side of the predetermined plane;
    a light detecting element which is disposed on the predetermined plane, the light detecting element detects the lights dispersed by the spectroscopic portion; and
    a package which has a light incident portion through which a light advancing to the spectroscopic portion is made incident into the inside of the package, the package houses the spectroscopic portion and the light detecting element, wherein,
    the body portion has a first plane surface substantially perpendicular to the predetermined plane, a second plane surface substantially perpendicular to the predetermined plane and the first plane surface, and a curved surface which is provided with the spectroscopic portion, the curved surface intersects with the predetermined plane, the first plane surface, and the second plane surface, and
    the package has a first inner wall surface coming into planar-contact with the first plane surface, a second inner wall surface coming into planar-contact with the second plane surface, and contact portions coming into contact with the curved surface.

2. The spectrometer according to claim 1, wherein the first plane surface is formed to be substantially parallel to an array direction of grating grooves of the spectroscopic portion, and the second plane surface is formed to be substantially vertical to the array direction of the grating grooves.

3. The spectrometer according to claim 1, wherein the contact portions are formed so as to be located on both sides of the spectroscopic portion in a direction substantially perpendicular to the first plane surface.

4. The spectrometer according to claim 1, wherein the package is composed of a light absorbing material.

5. The spectrometer according to claim 1, wherein a light absorbing film is formed on the first plane surface and the second plane surface.

* * * * *